United States Patent [19]

Leibman

[11] Patent Number: 5,440,949
[45] Date of Patent: Aug. 15, 1995

[54] WORKPIECE MANDREL WITH AXIALLY MOVING DYNAMIC BALANCER

[75] Inventor: Bernard Leibman, Webster, N.Y.

[73] Assignee: Xerox Corporation, Stamford, Conn.

[21] Appl. No.: 108,524

[22] Filed: Aug. 19, 1993

[51] Int. Cl.⁶ .............................................. F16F 15/10
[52] U.S. Cl. ........................................ 74/574; 82/163; 269/47; 269/52; 408/143
[58] Field of Search ..................... 74/574; 269/47, 48, 269/50, 52; 408/143; 409/141; 82/163, 173, 904

[56] References Cited

U.S. PATENT DOCUMENTS

| | | | |
|---|---|---|---|
| 1,627,917 | 4/1926 | Masury | 74/574 |
| 3,593,605 | 7/1971 | Cudnohufsky | 82/40 R |
| 4,043,431 | 8/1977 | Ellege | 74/574 |
| 4,044,861 | 8/1977 | Abu-Akeel et al. | 188/1 B |
| 4,126,066 | 11/1978 | Wagor et al. | 74/574 |
| 4,193,724 | 3/1980 | Morse | 409/141 |
| 4,671,127 | 6/1987 | Yamaguchi et al. | 74/574 |
| 5,095,786 | 3/1992 | Bellinghausen et al. | 74/574 |
| 5,142,936 | 9/1992 | McGale | 74/573 F |

Primary Examiner—Charles A. Marmor
Assistant Examiner—Sherry Lynn Estremsky
Attorney, Agent, or Firm—John S. Wagley

[57] ABSTRACT

An apparatus for dampening vibration during machining of a rotating sleeve. The apparatus includes a base disposed interiorly of the sleeve at a selected location along the sleeve longitudinal axis. The base is spaced from the sleeve. The apparatus also includes a member mounted radially movable on the base. The member is adapted to move radially into contact with the sleeve interior surface in response to the sleeve being rotated during machining thereof so as to dampen vibration of the sleeve.

10 Claims, 5 Drawing Sheets

WORKPIECE MANDREL WITH AXIALLY MOVING DYNAMIC BALANCER

The present invention relates to a method and apparatus for supporting workpieces during machining operations. More specifically, the invention relates to a dampener for reducing machining induced workpiece imperfections.

Many mechanical components, in particular those made of metals, are manufactured, at least in part, by being machined or turned on a metal cutting lathe or similar device. A lathe is a machine that has an electric motor driven rotating spindle to which a workpiece is secured. A cutting tool is secured to a slide on a stationary portion of the machine. The tool is forced into the workpiece. Since the tool is harder than the workpiece, metal is sheared from the workpiece, whereby the workpiece is machined into precise round dimensions.

To operate properly, the machine has operating clearance between relatively moving components, particularly around the slide and the spindle. The large mechanical forces necessary to shear the metal from the workpiece, induce mechanical vibrations into the machine. The clearance between components, any eccentricities in the machine components or workpiece, the flexing of lathe components under these forces, and the flexing of the workpiece during machining serve to amplify the vibrations.

When machining frail or eccentric workpieces, the vibrations can result in chatter or surface imperfections that may be unacceptable. This is particularly true in critical components such as photoreceptor tubes used in the xerographic process to receive the latent image from which a copy is developed. Any imperfections in the tube will result in inferior copy quality.

Devices for reducing machining induced workpiece imperfections are frequently used on lathes. These devices are typically secured to the workpiece to stiffen the workpiece, dampen chatter from the workpiece, counterbalance an eccentric workpiece, or a combination thereof.

Devices for reducing machine induced workpiece imperfections are well known. Typically the following disclosures may be relevant to various aspects of the present invention:

U.S. Pat. No. 5,142,936
  Patentee: McGale
  Issue Date: Sep. 1, 1992
U.S. Pat. No. 5,095,786
  Patentee: Bellinghausen et al.
  Issue Date: Mar. 17, 1992
U.S. Pat. No. 4,671,127
  Patentee: Yamaguchi et al.
  Issue Date: Jun. 9, 1987
U.S. Pat. No. 4,193,724
  Patentee: Morse
  Issue Date: Mar. 18, 1980
U.S. Pat. No. 4,126,066
  Patentee: Wagor et al.
  Issue Date: Nov. 21, 1978
U.S. Pat. No. 4,044,861
  Patentee: Abu-Akeel et al.
  Issue Date: Aug. 30, 1977
U.S. Pat. No. 4,043,431
  Patentee: Ellege
  Issue Date: Aug. 23, 1977
U.S. Pat. No. 3,593,605
  Patentee: Cudnohufsky
  Issue Date: Jul. 20, 1971

U.S. Pat. No. 5,142,936 discloses an apparatus for dynamically balancing rotating objects while they are in motion. A fixture that has a passageway for rotating objects is attached to the rotating object. Weights are permitted to orbit in the passageway.

U.S. Pat. No. 5,095,786 discloses an outer inertia ring that is fitted to a shaft of a lathe used to turn brake rotors. The inertia ring surrounds the shaft and is spaced from the shaft by elastic material.

U.S. Pat. No. 4,671,127 discloses a vibration suppressing device for use in a feed screw mechanism. An outer inertia ring is loosely fitted around the shaft of the feed screw mechanism.

U.S. Pat. No. 4,193,724 discloses a torsional vibration dampener for a lathe. A loosely fitted inertia wheel surrounds a lathe chuck and orbits about the chuck when the chuck rotates.

U.S. Pat. No. 4,126,066 discloses a brake lathe harmonic dampener. A loosely fitted inertia ring surrounds a work holding arbor which holds a brake drum during machining on a lathe.

U.S. Pat. No. 4,044,861 discloses a support device for a rotating bar. An arrangement of three rollers, each of which is attached to an end of a hydraulic cylinder and each of which is in rolling contact with a rotating bar, cradle and support the rotating bar.

U.S. Pat. No. 4,043,431 discloses a vibration damper for a brake rotor. The damper includes an elastic tube that is stretched around the rotor and has weights located within the tube.

U.S. Pat. No. 3,593,605 discloses a dynamic balancing device for the mass production of rotating unbalanced workpieces. The device includes a spring biased cylinder which is a part of a work holding fixture. The cylinder moves radially outward during rotation.

In accordance with one aspect of the present invention, there is provided an apparatus for dampening vibration during machining of a rotating sleeve. The apparatus comprises a base disposed interiorly of the sleeve at a selected location along the sleeve longitudinal axis. The base is spaced from the sleeve. The apparatus also comprises a member mounted radially movable on the base. The member is adapted to move radially into contact with the sleeve interior surface in response to the sleeve being rotated during machining thereof so as to dampen vibration of the sleeve.

The invention will be described in detail herein with reference to the following figures in which like reference numerals denote like elements and wherein:

FIG. 1A is a partial perspective view of the dynamic balancer of FIG. 1;

Figure 1:
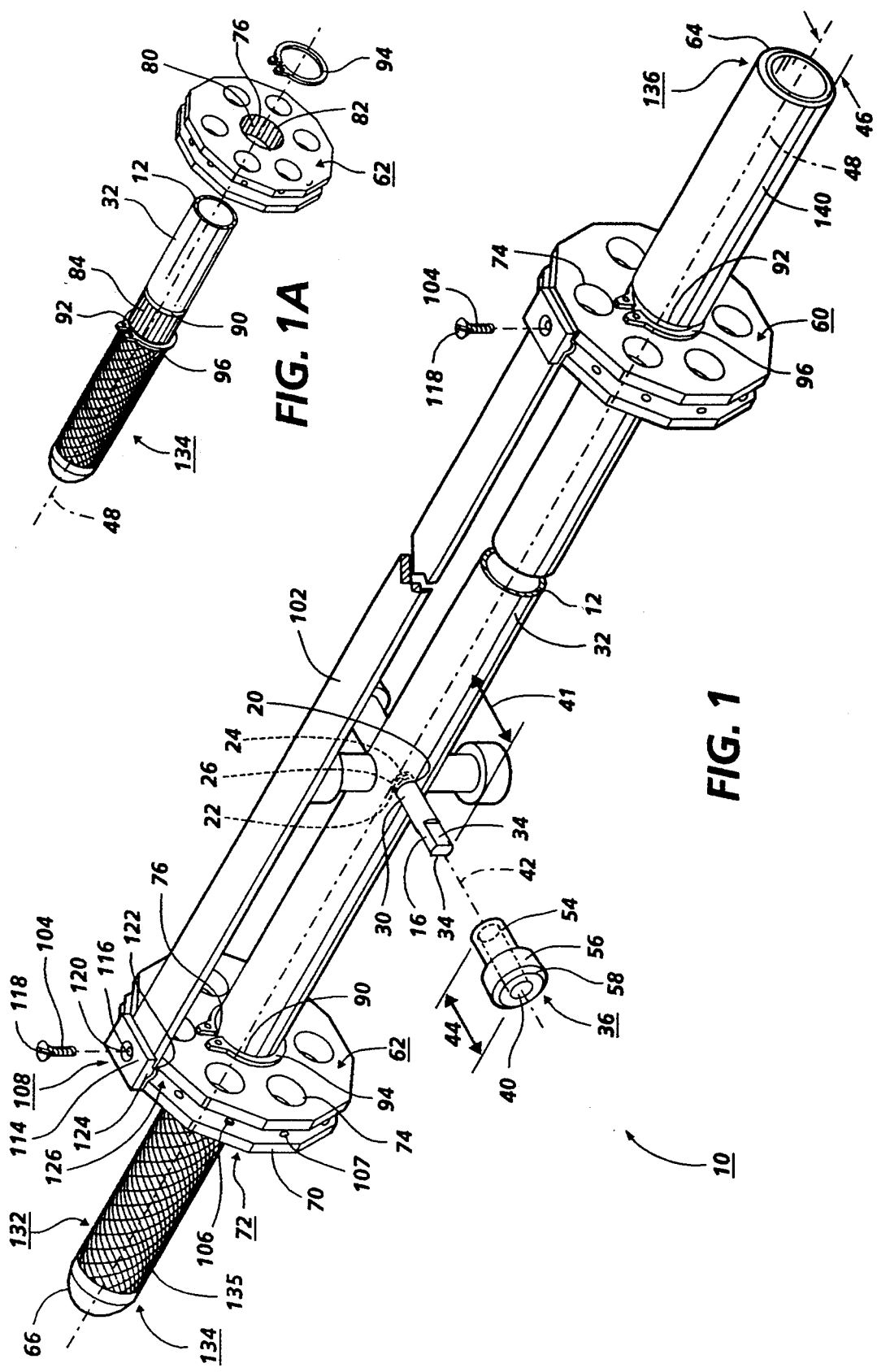
FIG. 1 is a perspective view of one embodiment of a dynamic balancer of the present invention.

One embodiment of a dynamic vibration dampener 10 incorporating the features of the present invention is shown in FIG. 1. The dampener 10 includes a base 12 which may have any suitable structural shape, such as solid or hollow, and may be in the form of a tube. A tube provides maximum strength with minimum weight. The base 12 may be made from any suitable material, but preferably in order to reduce weight, is made of an aluminum alloy, such as aluminum alloy number 3003. The base 12 has a long slender shape and extends along the length of a workpiece 14 as shown in FIG. 2.

Again referring to FIG. 1, a guide 16 extends perpendicularly from the base 12, and may have any suitable structural configuration. One such configuration is in the form of a solid cylindrical rod. The guide 16 is made from a sufficiently strong and durable material, such as a metal, and to reduce weight, may be made of aluminum from aluminum alloy number 3003. The guide 16 may be secured to the base 12 by any suitable means, such as by welding, soldering, or a press fit. Alternatively, the base 12 may have an opening or cross hole 20 to which internal threads 22 are formed. External threads 24 are formed on stem 26 at an end 30 of the guide 16. The external threads 24 matingly engage the internal threads 22 of the base 12 thereby securing the guide 16 to the base 12. Preferably, to securely seat the guide 16 against external surface 32 of the base 12, the guide 16 has flats 34 machined thereon.

A mass 36 has a centrally located opening or through hole 40 which slidably fits over guide 16. The guide 16 has a length 41 along axis 42 of hole 40 which is slightly shorter than length 44 of mass 36. The longer length 44 of the mass 36 assures that the mass 36 and not the guide 16 contacts the workpiece 14 (see FIG. 2). Again referring to FIG. 1, Applicant has found that the length 41 of the guide 16 is preferably approximately 90% of the length 44 of the mass 36.

Figure 2:
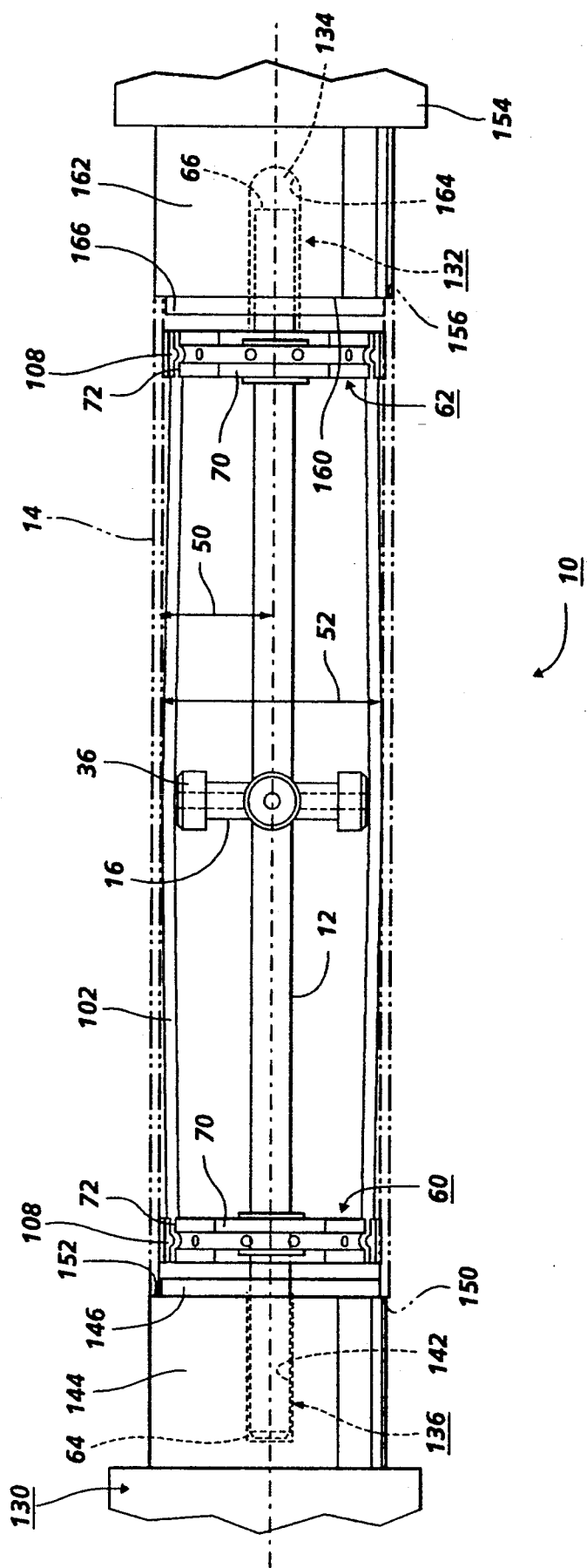
FIG. 2 is a plan view of the dynamic balancer of FIG. 1, mounted in a turning machine.

Now referring to FIGS. 1 and 2, Applicant has further found that in order to assure the loading of the dynamic vibration dampener 10 into sleeve or workpiece 14, radius 46 of the base 12 from center line 48 of the base 12 to the external surface 32 of the base 12 when added to the length 44 of the mass 36 must be less than radius 50 of bore 52 of the workpiece 14. Applicant has also found that, preferably, the sum of the radius 46 of the base 12 and the length 44 of the mass 36 should be approximately 80% of the radius 50 of the workpiece 14.

Again referring to FIG. 1, while the mass 36 may operate successfully when constructed of one piece, preferably, the mass 36 has a two piece construction. The mass 36 may comprise a first metal portion 54 and a second non-metal portion 56. The non-metal portion 56 serves as a cap over the first metal portion 54. The metal portion 54, preferably, is made of a dense material such as brass or bronze. Applicant has found when machining a cylindrical sleeve with a diameter of approximately 3.3 inches, a length of approximately 16.0 inches, and a wall thickness of 0.140 inches, the mass 36 with first metal portion 54 having a weight of approximately 0.75 ounce is most effective in reducing vibration on the workpiece.

Applicant has found that the non-metal portion 56 is preferably made of a soft plastic such as a polyamide polymer or acetal resin. The soft material serves to reduce wear and abrasion upon the workpiece or materials that may be located therebetween. The placement of a chamfer or radius 58 located on the outer edges of the non-metal portion 56 has been found to reduce wear and abrasion on the workpiece.

While vibration dampening can be accomplished somewhat with the use of one mass, preferably, more than one mass is incorporated into the vibration dampener 10. Applicant has found that equally spaced and diametrically opposed masses 36 are most effective in reducing vibration. For a photoreceptive sleeve with a diameter of 3.3 inches, Applicant has found that six equally spaced and diametrically opposed masses 36 are preferred. FIGS. 1–5 depict four masses 36 for illustrating simplicity, although, as earlier stated, six masses 36 are preferred.

Again referring to FIG. 2, to orient and stabilize the workpiece 14 during loading of the workpiece 14, the dynamic vibration dampener 10 preferably includes a first round member 60. The round member 60 slidably fits within the bore 52 of the workpiece 14 and thereby stabilizes and supports the workpiece 14 during loading. The first round member 60 may be, if it has a sufficient length, adequate to support and orient the workpiece 14, but, preferably, the dynamic vibration dampener 10 also includes a second round member 62. The first and second members 60 and 62 are located near first and second ends 64 and 66, respectively, of the dampener 10. The round members 60 and 62 serve to centrally orient the tube 12 on the dampener 10.

Again referring to FIG. 1, the first round member 60 and the second round member 62 are essentially identical and, therefore, the second round member 62 will be described as representative of both first round member 60 and second round member 62. The second round member 62 preferably has an even number of diametrically opposed flats 70 along periphery 72 of the member 62. The flats 70 are aligned axially with the masses 36 for reasons which will be later detailed. To reduce the weight of the dampener 10, the second round member 62 may include openings or voids such as axial holes 74 evenly spaced within the round member 62.

Now referring to FIG. 1A, to secure the second round member 62 to the dampener 10, the second round member 62 has a centrally located opening or cylindrical hole 76 through which the tube 12 fits. The second round member 62 may be secured to the tube 12 by any suitable means such as press fit, welding, etc. For example, the second round member 62 has axial grooves or splines 80 located around periphery 82 of the hole 76. The splines 80 of the second round member 62 matingly engage axial grooves or splines 84 of outer surface 32 of the tube 12. The splines 80 and 84 prevent relative rotation between the member 62 and the tube 12.

To avoid axial movement of the second round member 62 relative to the tube 12, the second round member 62 is axially affixed relative to tube 12. The second round member 62 may be axially affixed by a number of suitable methods including welding and being interferencely fitted, for example, the tube 12 has an inner circumferential groove 90 and an outer circumferential groove 92. The second round member 62 is positioned around the tube 12 between the inner and outer grooves 90 and 92, respectively. Inner and outer snap rings 94 and 96, respectively, are secured in the inner and outer grooves 90 and 92, respectively.

Again referring to FIG. 1, the first round member 60 is likewise radially secured to the tube 12 by splines identical to splines 80 and 82 of FIG. 1A. The first round member is further axially secured to the tube 12 by rings and grooves identical to snap rings 94 and 96 located in grooves 90 and 92, respectively.

Referring to FIG. 2, in addition to the function of the first and second round members 60 and 62, respectively, to align and position the workpiece 14, the members 60 and 62, preferably, are used to support dampening means 102 which may be in the form of a strap. The strap 102 serves as a cushion or dampener between the mass 36 and the workpiece 14. While the strap 102 may take a variety of suitable forms, some of which are described in later embodiments of the present invention, the strap 102 may have a rectangular cross section and extends from the first round member 60 to the second round member 62. The strap 102 may be made of any suitable resilient material such as rubber, and, preferably, is made from a high density polyurethane rubber.

While the invention may be practiced with a singular strap 102, preferably, a multitude of equally spaced straps 102 are used. Each strap 102 extends from the flat 70 on the first round member 60 to the flat 70 on the second round member 62. The flats 70 on the first and second round members 60 and 62, respectively, are are so aligned with each other and the mass 36 so that the straps 102 are positioned between one of the masses 36 and the workpiece 14.

Again referring to FIG. 1, the strap 102 is secured to the first and second round member 60 and 62, respectively, by any suitable method such as by screws 104. The screws 104 may take any suitable form, for example, as self tapping screws which tap threads 106 into radial holes 107 thereby securing the straps 102.

To properly secure the straps 102, pads 108 are positioned between the screws 104 and the straps 102. The pads 108 may have any suitable shape but, preferably, have an elongated arcuate shape with an outer face 114 which conforms to the workpiece bore 52 (see FIG. 2). Again referring to FIG. 1, centrally located on the outer face 114 is a through hole 116 through which the screw 104 slidingly fits. Preferably, the screw 104 has a flat head 118 which fits below a chamfer 120 in the outer face 114.

The pads 108, preferably, also include an inner face 122 spaced from and generally parallel to the outer face 114. A rib 124 is centrally located along the length of the inner face 122 and matingly engages a channel 126 centrally located along the periphery 72 of the first and second round members 60 and 62, respectively. The straps 102 are thereby crimped between the rib 124 and the channel 126, thereby adequately securing them to the dampener 10.

To assist in the loading of the workpiece 14 into a turning machine 130 as shown in FIG. 2, the dynamic vibration dampener 10 is preferably provided with a handle 132 extending outwardly from the second round member 62, as shown in FIG. 1. The handle 132 may have any suitable shape but, for simplicity, may be an extension of the base 12. Preferably, to assist in gripping the handle 132, the handle 132 includes an outer sleeve 134 which slidably fits over the handle 132. Alternatively, the sleeve 134 may include an outer surface 135 which has a spiraled and cross hatched pattern or in some other form of a rough surface to further assist in the gripping of the handle.

To assist in loading the dampener 10, a stem 136 extends centrally and outwardly from the first round member 60. The stem 136, for simplicity, may be an extension of the tube 12. To improve the operational life of the dampener 10, a replaceable sleeve 140 may be interferencely fitted over the stem 136.

Again referring to FIG. 2, to load a workpiece 14 into the machine 130, the operator grabs the dampener 10 by the handle 132 with one hand and inserts it into the workpiece bore 52. The operator then horizontally positions the dampener and sleeve assembly into the machine 130, which may be a horizontal turning machine, such as a tracer lathe or a numerically controlled lathe. The stem 136 is inserted into an opening 142 in a headstock adaptor 144 of the machine 130. The stem 136 is slidably fit to the opening 142, whereby, the bore 52 of the workpiece 14 may slidably fit over headstock pilot 146 located outboard on the headstock adapter 144. A first end face 150 of workpiece 14 seats against a headstock locating face 152.

To complete the loading of the machine, the operator moves a tailstock 154 located on the machine 130 opposite the headstock adaptor 144 toward the headstock adaptor 144. A second end face 156 of the workpiece 14 thereby seats against tailstock locating face 160 of tailstock adaptor 162. The tailstock adaptor 162 also includes a tailstock opening 164 which receives the handle 132. Similarly to the headstock pilot 146, the workpiece 14 slidably fits over tailstock pilot 166. In this loaded position, the dynamic vibration dampener 10 serves merely to provide dampening for the workpiece 14 while the part is held and driven between the headstock adaptor 144 and the tailstock adaptor 162.

After the workpiece 14 has been completely loaded into the machine 130, the operator begins the operational cycle of the machine. First, the headstock adaptor 144 begins to rotate, causing the workpiece 14 located between the headstock locating face 152 and the tailstock locating face 160 to also rotate. As the workpiece 14 and the dynamic vibration dampener 10 begin to rotate, the masses 36 move outwardly onto the straps 102 by centrifugal force and press the straps 102 against the workpiece 14. As the rotational speed of the machine 130 increases, the force of the masses 36 against the straps 102 increase, thereby providing a dampening force proportional to the vibrating forces.

Figure 3:
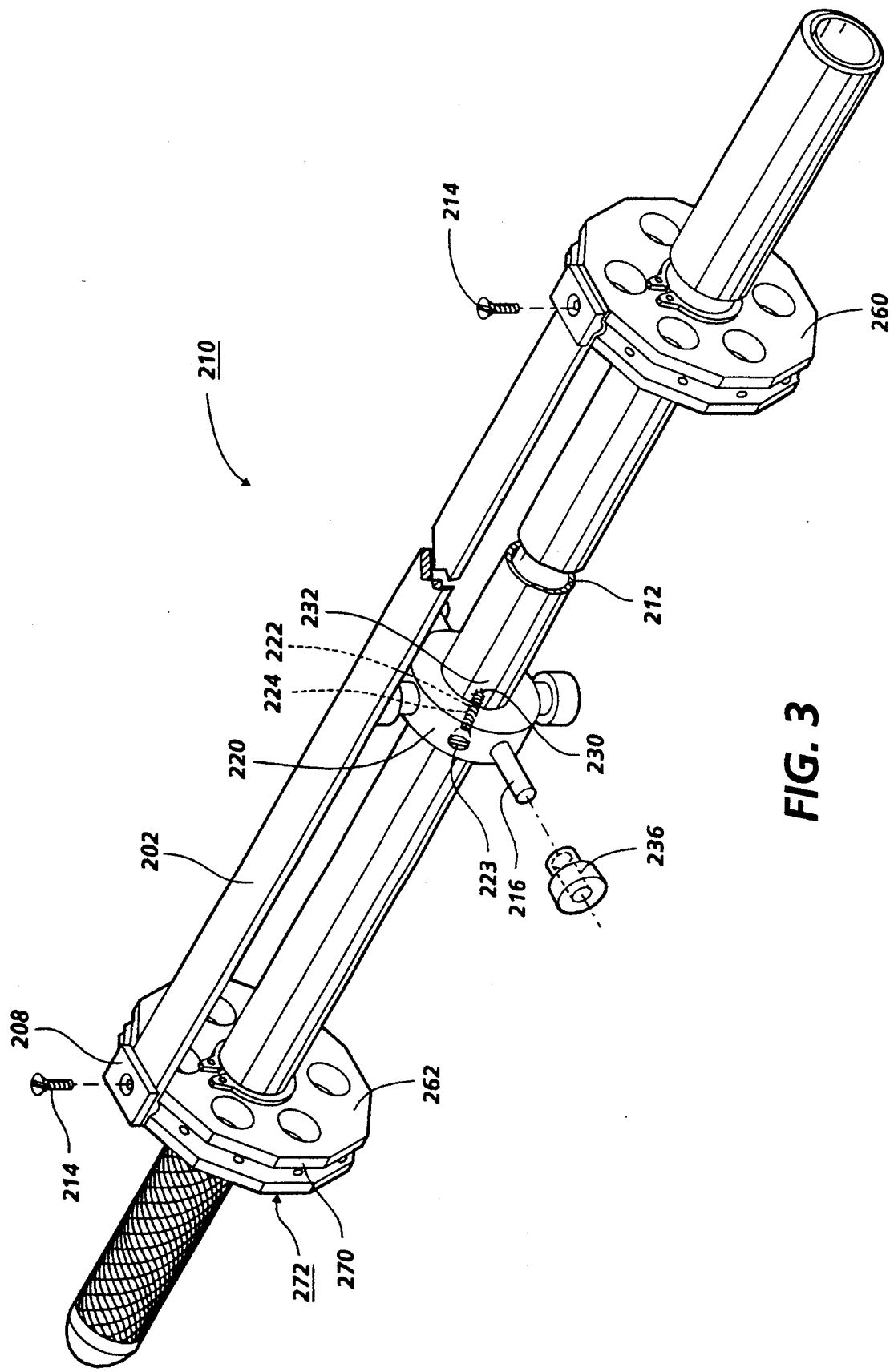
FIG. 3 is a perspective view of another embodiment of an alternate design of a dynamic balancer of the present invention.

While the embodiment of the dynamic dampener 10 as shown in FIGS. 1 and 2 represents a preferred embodiment of the present invention, other embodiments fall within the intent of the invention. Dynamic vibration dampener 210 as shown in FIG. 3 represents one of these alternative embodiments.

Applicant has found that the position of the masses along the centerline of the base is critical for the optimum performance of the dampener. Applicant has thereby found that, preferably, different configurations of the dampener must be experimentally utilized, each dampener having a unique axial location of the masses, to empirically determine the proper position of the masses. To overcome this need for a multitude of dampeners, Applicant has found that the dampener 210 as shown in FIG. 3, with a slidable support 220 can be used to more easily optimize the location of the mass. Dampener 210 is similar to the dampener of FIGS. 1 and 2 and has a base or tube 212 of a similar construction to that of the base of the dampener of FIGS. 1 and 2. The support 220 slidably fits about the tube 212. The slidable support 220 may be secured in its axial position along the tube 212 by any suitable means. For example, the slidable support 220 may include a radial hole 222 which extends through the support 220. A set screw 223 matingly engages threads 224 in hole 222 and has a point 230 which engages a flat 232 on the tube 212 thereby axially securing the slidable support 220 to the tube 212.

Guides 216 extend radially from the slidable support 220 and guide masses 236. Each mass 236 is radially aligned with a corresponding strap 202 and a flat 270 located on a periphery 272 of support members 260 and 262. Similarly to the dampener of FIGS. 1 and 2, the dampener 210 has pads 208 through which screws 214 slidably fit. The screws 214 are threadedly attached to the first support member 260 and the second support member 262. The dampener 210 is loaded into the machine in an identical procedure as to that used for the dampener of FIG. 1.

Figure 4:
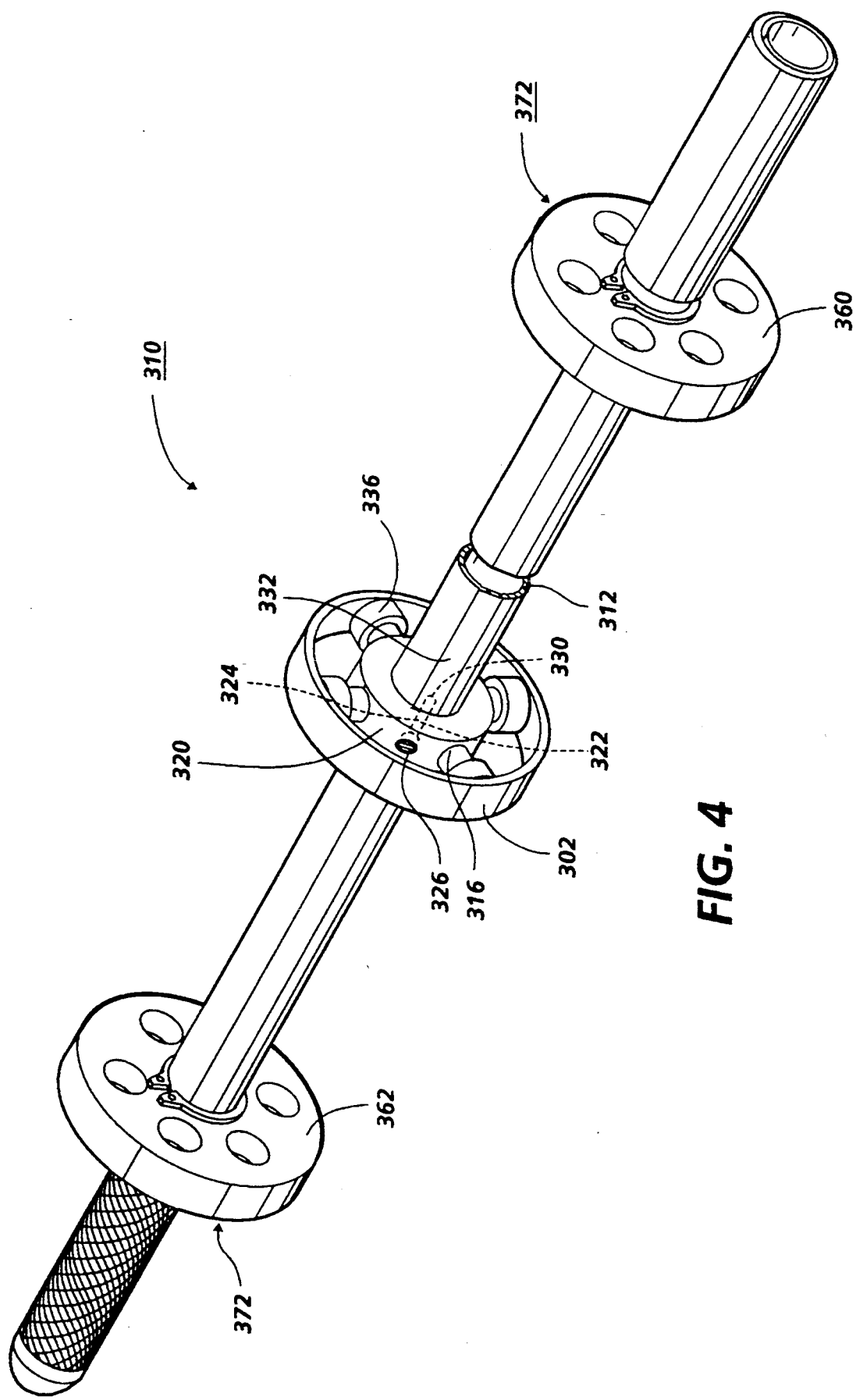
FIG. 4 is a perspective view of another embodiment of a dynamic balancer of the present invention.

A slightly more simple embodiment of the present invention is shown in dynamic vibration dampener 310 as shown in FIG. 4. Dampener 310 is somewhat similar to the dampener of FIG. 3 and dampener 310 includes a slidable support 320 similar to the slidable support of the dampener of FIG. 3. Slidable support 320 is slidably fit to base 312 and is preferably axially secured to base 312 by means of a set screw 326 which is threadedly fitted to threads 324 in hole 322 of the support 320. Point 330 on set screw 326 matingly engages flat 332 of the base 312 thereby axially securing the slidable support 320. Guides 316 radially extend from the support 320. Masses 336 slidably fit about guide 316. Dampener 302 in the form of a circumferential strap extends circumferentially over the masses 336. The circumferential strap 302 is made of a similar material to that of the straps of the dampener of FIGS. 2 and 3. The dampener 310 also includes first and second support members 360 and 362, respectively. Periphery 372 of the first and second members 360 and 362, respectively, unlike the first and second round members of the dampeners of FIGS. 2 and 3, have a cylindrical periphery. The circumferential strap 302 may likewise be utilized in other embodiments of the present invention and may be substituted for the longitudinal straps of the dampeners of FIGS. 2 and 3.

Figure 5:
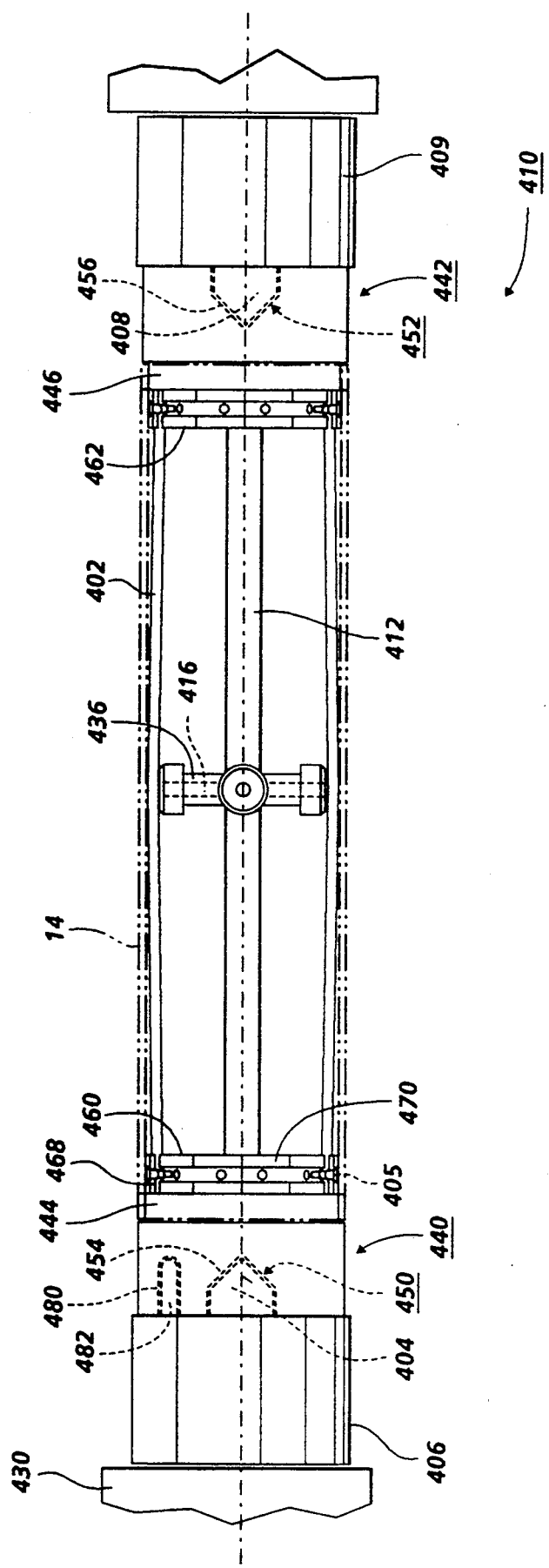
FIG. 5 is a plan view of a work holding arbor incorporating the dynamic balancer of the present invention, the arbor being mounted in a turning machine.

While the embodiments of the present invention as shown in FIGS. 1-4 are suitable for high volume and dedicated operations, the use of this invention is also applicable to use in lower volume operations where machine adaptors and modifications are undesirable. In such applications arbor 410 as shown in FIG. 5 may be utilized. The arbor 410 is adaptable to a turning machine 430 merely having a headstock center 404 extending from a headstock 406 and a tailstock center 408 extending from a tailstock 409.

The arbor 410 includes a base 412 having a composition and configuration similar to the base of the dampener of FIG. 1. Guides 416 extend radially from the base 412. Masses 436 slidably fit about guides 416. First and second round members 460 and 462, respectively, are located near a first end 440 of arbor 410 and a second end 442 of arbor 410, respectively. Straps 402 are located between the first and the second members 460 and 462, respectively. The straps 402 are secured by screws 405 which secure pads 468 to flats 470 in the members 460 and 462, thereby crimping and securing the straps 402.

First and second gripping members 444 and 446, respectively, are located outwardly from the first and second round members 460 and 462, respectively. The gripping members 444 and 446 may be any suitable gripping device including, but not limited to, collets, mechanical chucks, or hydraulic arbors. Located outwardly from the first and second gripping members 444 and 446, respectively, are headstock receiver 450 and tailstock receiver 452, respectively. Headstock receiver 450 includes a tapered opening 454 for receiving the headstock center 404. Tailstock receiver 452 includes a tapered hole 456 for receiving the tailstock center 408.

An operator loads workpiece 14 into the arbor 410 by slidably fitting the workpiece 14 over the arbor 410. The arbor 410 is then horizontally lifted at the ends 440 and 442 and placed in the machine 430 with the tapered openings 454 and 456 of the arbor 410 engaging the centers 404 and 408, respectively. The arbor 410 may include a drive dog receiver 480 which may be in the form of a hole in the headstock receiver. The drive dog receiver 480 would, then, engage a drive dog 482 located in the headstock 406.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An apparatus for dampening vibration of a rotating sleeve during machining thereof, comprising:
   a base adapted to be disposed interiorly of the sleeve and spaced from the sleeve;
   a member mounted radially movable on said base, said member being adapted to move radially into contact with the sleeve interior surface in response to the sleeve being rotated during machining thereof so as to dampen vibration of the sleeve; and
   a support member attached to said base with the sleeve being slidably mountable on said support member.

2. The apparatus of claim 1, wherein said member comprises:
   a guide attached to said base and extending radially therefrom; and
   a mass mounted slidably on said guide, said mass being adapted to slide along said guide into contact with the sleeve interior surface.

3. The apparatus of claim 2, further comprising a dampening member adapted to be interposed between said mass and the sleeve interior surface.

4. The apparatus of claim 3, wherein said dampening member comprises a pad made of resilient material.

5. The apparatus of claim 2, wherein said mass comprises a metal material.

6. The apparatus of claim 2, wherein said mass comprises a first metal portion slidably mounted on said guide and a non-metal portion attached to said metal portion.

7. The apparatus of claim 2, wherein said base and said guide are formed of materials selected from the group consisting of plastics, aluminum, aluminum alloys, and magnesium alloys.

8. The apparatus of claim 3, further comprising a support located along the sleeve longitudinal axis, said base being mounted slidably in said support.

9. An apparatus for dampening vibration of a rotating sleeve during machining thereof, comprising:
   a base adapted to be disposed interiorly of the sleeve and spaced from the sleeve; and
   a member mounted radially movable on said base, said member being adapted to move radially into contact with the sleeve interior surface in response to the sleeve being rotated during machining thereof so as to dampen vibration of the sleeve;

a first support member attached to said base, said first support member being located near a first end of said base; and a second support member attached to said base and being located near a second end of said base, with the sleeve being slidably mounted on said first support member and said second support member.

10. The apparatus of claim 9, further comprising a dampening member including an elongated flexible member having a first end attached to a periphery of said first support member and a second end attached to a periphery of said second support member.

* * * * *